US009431921B2

(12) United States Patent
Quigley

(10) Patent No.: US 9,431,921 B2
(45) Date of Patent: Aug. 30, 2016

(54) CONTROLLING CAPACITIVE SNUBBER AS FUNCTION OF CURRENT IN INVERTER

(75) Inventor: Stephen J. Quigley, Hampstead, NH (US)

(73) Assignee: Analogic Corporation, Peabody, MA (US)

( * ) Notice: Subject to any disclaimer, the term of this patent is extended or adjusted under 35 U.S.C. 154(b) by 862 days.

(21) Appl. No.: 13/461,270

(22) Filed: May 1, 2012

(65) Prior Publication Data

US 2013/0293008 A1 Nov. 7, 2013

(51) Int. Cl.
| | |
|---|---|
| *G05F 3/06* | (2006.01) |
| *H02M 7/44* | (2006.01) |
| *H02M 1/34* | (2007.01) |
| *H02M 7/5387* | (2007.01) |
| *H02M 7/48* | (2007.01) |

(52) U.S. Cl.
CPC .............. *H02M 7/44* (2013.01); *H02M 1/34* (2013.01); *H02M 7/5387* (2013.01); *H02M 2001/342* (2013.01); *H02M 2007/4815* (2013.01); *Y02B 70/1441* (2013.01); *Y02B 70/1491* (2013.01); *Y10T 307/25* (2015.04)

(58) Field of Classification Search
CPC ......... H02M 7/44; H02M 2007/4815; H02M 7/5387; H02M 2001/342; H02M 1/34; H02M 2001/008; H02M 3/158; H02M 5/4585; H02M 7/48; H02M 7/49; H02M 2007/4835; H02M 3/156; H02M 7/53871; H02M 11/00; H02M 1/10; H02M 1/126; H02M 2001/0025; H02M 2001/0051; H02M 2001/007; H02M 3/1584; H02M 7/493; H02M 1/32; H02M 2001/0077; Y02B 70/1441; Y02B 70/1491
USPC .................... 363/131; 307/11, 151
See application file for complete search history.

(56) References Cited

U.S. PATENT DOCUMENTS

| | | | |
|---|---|---|---|
| 4,502,085 A | 2/1985 | Morrison et al. | |
| 4,672,528 A | 6/1987 | Park et al. | |
| 4,876,635 A * | 10/1989 | Park ...................... | H02M 3/337 363/132 |
| 5,014,180 A * | 5/1991 | Nuechterlein .......... | H02M 1/38 361/111 |
| 5,258,902 A * | 11/1993 | Lindbery ................ | H02M 1/34 363/132 |
| 5,642,273 A * | 6/1997 | Lai .......................... | H02M 1/34 363/132 |
| 6,046,920 A * | 4/2000 | Cazabat ............... | H02M 7/5236 363/136 |
| 6,052,294 A * | 4/2000 | Jacobs .................... | H02M 1/34 363/126 |
| 2006/0244428 A1* | 11/2006 | Jitaru ....................... | H02M 1/34 323/222 |
| 2011/0222651 A1* | 9/2011 | Ogawa .............. | H02M 7/53871 378/20 |

* cited by examiner

*Primary Examiner* — Jung Kim
*Assistant Examiner* — Esayas Yeshaw
(74) *Attorney, Agent, or Firm* — Cooper Legal Group, LLC

(57) ABSTRACT

One or more systems and/or techniques are provided for electrically coupling and/or decoupling a capacitive snubber component to/from an inverter as a function of a current in the inverter. A current sensing component may be configured to measure the current in the inverter and/or determine whether the current in the inverter exceeds a desired threshold. The desired threshold may be set at a value sufficient to reset the capacitive snubber component. When the current in the inverter is above the desired threshold, the capacitive snubber component may be coupled to the inverter. When the current in the inverter is below the desired threshold, the capacitive snubber component may be decoupled from the inverter. In this way, little to no energy stored in the capacitive snubber component may be dissipated in the inverter when the current in the inverter drops below a level sufficient to reset the capacitive snubber component.

19 Claims, 5 Drawing Sheets

CONTROLLING CAPACITIVE SNUBBER AS FUNCTION OF CURRENT IN INVERTER

BACKGROUND

The present application relates to inverters comprising a snubber and in particular to series resonant inverters comprising one or more capacitive snubbers. It finds particular application with radiology imaging modalities utilized in medical, security, and/or other applications. However, it also relates to other applications comprising inverters configured to produce an average power output that differs substantially (e.g., by a factor of 5 or more) from a peak power output and/or configured to output power over a large dynamic range.

CT and other radiography imaging modalities (e.g., single-photon emission computed tomography (SPECT), mammography, digital radiography, etc.) are useful to provide information, or images, of interior aspects of an object under examination. Generally, the object is exposed to radiation photons (e.g., such as X-rays, gamma rays, etc.), and an image(s) is formed based upon the radiation absorbed and/or attenuated by the interior aspects of the object, or rather an amount of photons that is able to pass through the object. Generally, highly dense sub-objects absorb and/or attenuate more radiation than less dense sub-objects, and thus a sub-object having a higher density, such as a bone or metal, for example, will appear on an image differently than less dense sub-objects, such as muscle or clothing.

The energy of radiation applied to an object is a function of the voltage applied to a radiation source emitting the radiation. Typically, the greater the voltage, the higher the energy. It may be appreciated that in some applications, such as in medical applications, it is desirable to alter the energy of radiation applied to the object as a function of the area being examined. For example, the energy of radiation applied during an examination of the brain may be less than the energy applied to image a foot because the brain comprises more delicate tissue than the foot. Moreover, although continued reference is made herein to imaging, it will be appreciated that radiation may also be utilized in the treatment of an object. In such applications, the energy of radiation may vary according to what is being treated and/or the pathway of radiation (e.g., whether the radiation passes through bone or merely soft tissue). Further, radiation in treatment and/or imaging modalities may be emitted in pulses, where respective pulses of radiation are followed by a resting period. While power supplied to the radiation source is reduced (e.g., to zero) during such resting times, a power supply may be configured to continue supplying power to other electronic components of the imaging modality.

It may be appreciated that in light of such conditions, a power source for a radiation imaging and/or treatment modality (e.g., particularly in medical applications where the energy of emitted radiation is varied widely), is configured to output power over a large dynamic range (e.g., 600 W or less when the source is not operating to 60 kW or more when the source is operating at maximum power, for example). Traditionally, the power source of a radiology modality has comprised an inverter, such as a resonant inverter, configured to convert direct current (DC) electrical signals into alternative current (AC) electrical signals at a desired voltage and/or to increase and decrease power dynamically (e.g., in a matter of nano- or microseconds) over a large range of various power output levels. To reduce switching losses in the inverter that occur when a switch is opened (e.g., turned off) and the voltage is increased, a snubber (e.g., such as a capacitive snubber) may be added to the inverter. The snubber is configured to reduce a rise time of the voltage, which in turn reduces the power dissipated during the transition (e.g., meaning switching losses are reduced).

SUMMARY

Aspects of the present application address the above matters, and others. According to one aspect, an inverter is provided. The inverter comprises a capacitive snubber component and a switching component. The switching component is configured to electrically couple the snubber component to the inverter and to electrically decouple the snubber component from the inverter based upon a current of an electrical signal in the inverter.

According to another aspect, a method for selectively coupling a capacitive snubber component to an inverter is provided. The method comprises measuring a current of an electrical signal in the inverter. The method also comprises electrically coupling the snubber component to the inverter when the current of the electrical signal is greater than a desired threshold and electrically decoupling the snubber component from the inverter when the current of the electrical signal is below the desired threshold.

According to yet another aspect, a radiology imaging modality is provided. The imaging modality comprises an ionizing radiation source configured to emit radiation, energy of the radiation a function of at least one of a voltage and a power supplied to the radiation source. The imaging modality also comprises a detector array configured to detect at least some of the emitted radiation that traversed an object under examination and an image generation component configured to generate an image of the object based at least in part upon the detected radiation. The imaging modality further comprises a power supply configured to provide power to the ionizing radiation source. The power supply comprises an inverter, which comprises a capacitive snubber component and a switching component configured to electrically couple the snubber component to the inverter and to electrically decouple the snubber component from the inverter based upon a current of an electrical signal in the inverter.

FIGURES

The application is illustrated by way of example and not limitation in the figures of the accompanying drawings, in which like references indicate similar elements and in which.

DESCRIPTION

Figure 1:
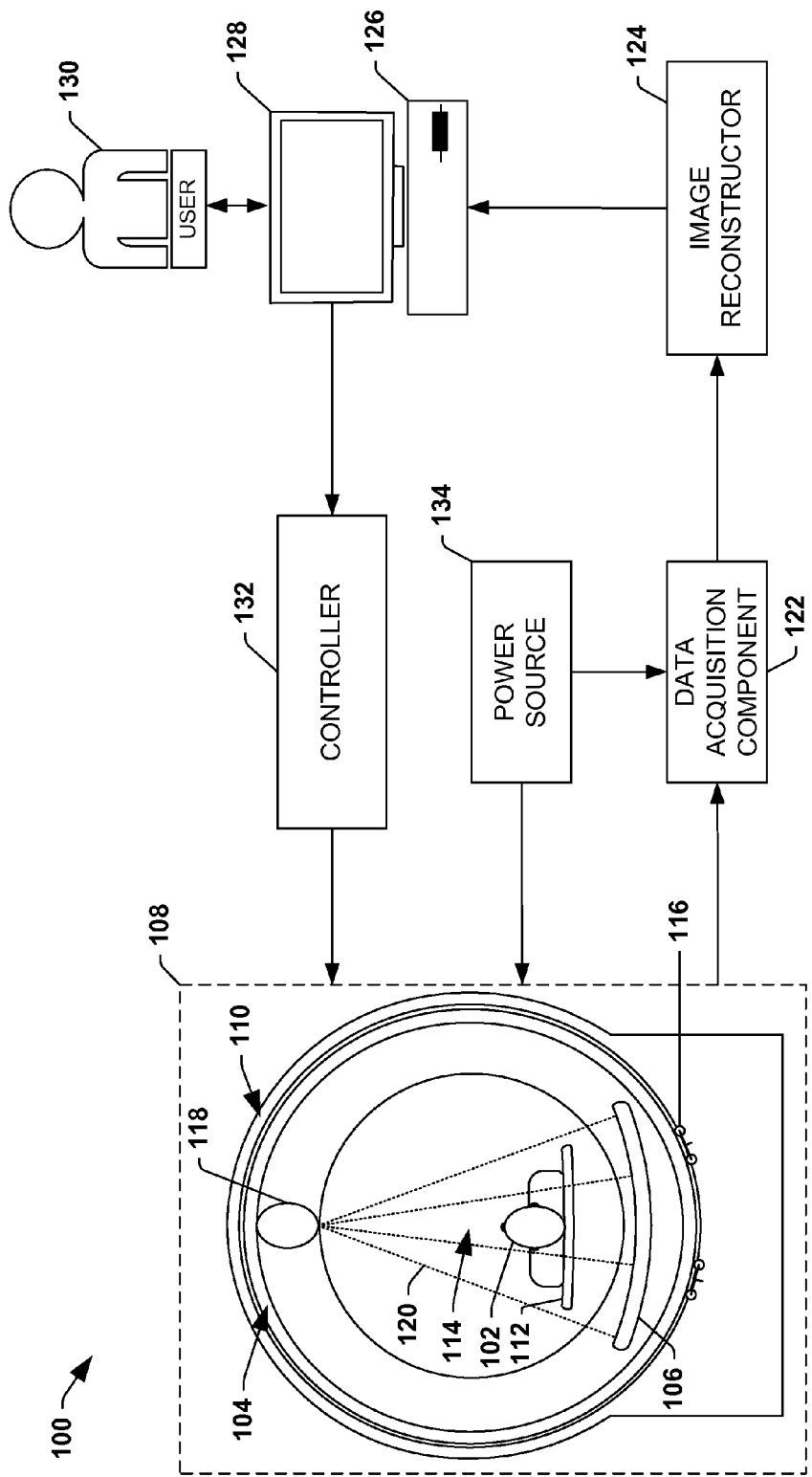
FIG. 1 is a component block diagram illustrating an example radiology modality where an inverter as provided for herein may be utilized.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

As described above, a snubber (e.g., such as a capacitive snubber) may be added to an inverter (e.g., such as a series resonant inverter) to reduce switching losses in the inverter that occur when a switch is open and a voltage in the inverter is increased. For example, a capacitive snubber may be configured to store at least some of the voltage, causing the rise time of the voltage (e.g., to a maximum voltage) to be slowed, which in turn reduces power dissipation during the transition (e.g., assuming the current behaves similarly with or without the snubber). Although the use of a snubber is advantageous for reducing power dissipation during switching, particularly when the current in (e.g., flowing through) the inverter is high, the snubber may be disadvantageous when the current in the inverter drops below a specified threshold. More particularly, when the current in the inverter becomes too low, there may not be enough current to reset the capacitive snubber before an electrical pulse (e.g., to increase power) is received. As such, energy remaining in the capacitive snubber may bleed into associated transistors, causing a dissipation of energy and/or power in the inverter. Such a dissipation of energy and/or power may negate the benefits of using the capacitive snubber, particularly at lower power levels.

Accordingly, among other things, one or more systems and/or techniques are described herein for selectively coupling a capacitive snubber to an inverter when it is advantageous and uncoupling the capacitive snubber from the inverter when it is disadvantageous. More particularly, an inverter comprises a switching component and a current sensing component. The current sensing component is configured to measure an amount of current flowing through the inverter (or determine if such current exceeds a desired threshold). When the current is above a desired threshold, the switching component is closed, causing the capacitive snubber (e.g., which may be in series with the switch switching component) to be electrically coupled to the inverter. When the current is below the desired threshold, the switching component is open, causing the capacitive snubber to be electrically decoupled from the inverter. Typically, the desired threshold is a function of an amount of current necessary to reset the capacitive snubber (e.g., and may be equal to a lowest amount of current capable of resetting the capacitive snubber). It may be appreciated that by coupling the capacitive snubber to the inverter when the current is greater than the desired threshold, the capacitive snubber may be utilized when switching losses are significant. By decoupling the capacitive snubber component from the inverter when the current is less than the desired threshold (e.g., and switching losses are less significant), energy remaining in the snubber component may not bleed into the inverter.

FIG. 1 illustrates an example environment 100 in which an inverter comprising a capacitive snubber that can be selectively coupled/decoupled from the inverter may be useful. More particularly, FIG. 1 illustrates an example radiology imaging modality (e.g., a third-generation CT modality) that may comprise such an inverter to supply power to a radiation source(s) 118, a detector array 106, and/or other electronic components of the radiology imaging modality. It may be appreciated that while specific reference is made herein to a CT modality, the instant application may find applicability to other radiology imaging and/or treatment modalities (e.g., such as digital/projection radiology, SPECT, mammography, etc.). Moreover, the disclosure may relate to other fields apart from radiology imaging and/or treatment, such as to fields where an inverter configured to output power over a large a dynamic range may be useful, and the scope of the appended claims is not intended to exclude the same.

In the example environment 100, an examination unit 108 of the imaging modality is configured to examine one or more objects 102 (e.g., a patient, suitcase, etc.). The examination unit 108 can comprise a rotating gantry 104 and a (stationary) support structure 110 (e.g., which may encase and/or surround as least a portion of the rotating gantry 104 (e.g., as illustrated with an outer, stationary ring, surrounding an outside edge of an inner, rotating ring)). During an examination of the object(s) 102, the object(s) 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object(s) 102 by a rotator 116, such as a motor, drive shaft, chain, roller truck, etc.

The rotating gantry 104 may surround a portion of the examination region 114 and may comprise one or more radiation sources 118 (e.g., an ionizing x-ray source, gamma radiation source, etc.) and a detector array 106 that is mounted on a substantially diametrically opposite side of the rotating gantry 104 relative to the radiation source(s) 118.

During an examination of the object(s) 102, the radiation source(s) 118 emits fan, cone, wedge, and/or other shaped radiation 120 configurations from a focal spot(s) of the radiation source(s) 118 (e.g., a point within the radiation source(s) 118 from which radiation 120 emanates) into the examination region 114. It may be appreciated that such radiation 120 may be emitted substantially continuously and/or may be emitted intermittently (e.g., a brief pulse of radiation is emitted followed by a resting period during which the radiation source 118 is not activated).

As the emitted radiation 120 traverses the object(s) 102, the radiation 120 may be attenuated differently by different aspects of the object(s) 102. Because different aspects attenuate different percentages of the radiation 120, an image(s) may be generated based upon the attenuation, or variations in the number of photons that are detected by the detector array 106. For example, more dense aspects of the object(s) 102, such as a bone or metal plate, may attenuate more of the radiation 120 (e.g., causing fewer photons to strike the detector array 106) than less dense aspects, such as skin or clothing.

The detector array 106 is configured to directly convert (e.g., using amorphous selenium and/or other direct conversion materials) and/or indirectly convert (e.g., using photodetectors and/or other indirect conversion materials) detected radiation into signals that can be transmitted from the detector array 106 to a data acquisition component 122 configured to compile signals that were transmitted within a predetermined time interval, or measurement interval, using various techniques (e.g., integration, photon counting, etc.). It may be appreciated that such a measurement interval may be referred to as a "view" and generally reflects signals generated from radiation 120 that was emitted while the radiation source 118 was at a particular angular range relative to the object 102. Based upon the compiled signals, the data acquisition component 122 can generate projection data indicative of the compiled signals, for example.

The example environment 100 also illustrates an image reconstructor 124 that is operably coupled to the data acquisition component 122 and is configured to generate one or more images representative of the object 102 under examination based at least in part upon signals output from the data acquisition component 122 using suitable analytical, iterative, and/or other reconstruction technique (e.g., tomosynthesis reconstruction, back-projection, iterative reconstruction, etc.). In a CT application, such images may be 3D images, for example, whereas in some other applications, such as projection scanners, the images output by the image reconstructor 124 may be 2D images, for example.

The example environment 100 also includes a terminal 126, or workstation (e.g., a computer), configured to receive image(s) from the image reconstructor 124, which can be displayed on a monitor 128 to a user 130 (e.g., security personnel, medical personnel, etc.). In this way, the user 130 can inspect the image(s) to identify areas of interest within the object(s) 102. The terminal 126 can also be configured to receive user input which can direct operations of the object examination apparatus 108 (e.g., a speed of gantry rotation, an energy level of the radiation, etc.).

In the example environment 100, a controller 132 is operably coupled to the terminal 126. In one example, the controller 132 is configured to receive user input from the terminal 126 and generate instructions for the examination unit 108 indicative of operations to be performed.

A power source 134 may be configured to deliver power to at least some components of the radiology imaging modality. For example, the power source 134, which may be positioned on a stationary side of the imaging modality, may be configured to supply power to the radiation source 118, the detector array 106, the data acquisition component 122, a heat sink (not illustrated), and/or other electronic components of the imaging modality. Power that is supplied to components on the rotating side of the imaging modality (e.g., coupled to the rotating gantry 104) may be transferred from the support structure 110 to the rotating gantry 104 via a slip-ring assembly and/or a contactless power transfer system, for example.

The power source 134 may be configured to output power over a large dynamic range. For example, when the radiation source 118 is operating at maximum power the power source 134 may be configured to output 60 kW or more compared to the 600 W or less the power source 134 may be configured to output when the radiation source 118 is resting. Moreover, the desired energy of emitted radiation (e.g., and desired radiation dose to the object 102) may affect power consumption by the radiation source 118, and thus affect power output by the power source. As such, the power source 134 may be configured to accommodate a fast switching of power outputs over a large dynamic range. Further, the power source 134 may be rated to have an average power output that is substantially less than its peak power output. For example, in one embodiment, an average power output may be in the range of 2-10 kW and a peak power output may be in the range of about 10-90 kW (e.g., meaning the peak output may be ten times more than the average output).

Figure 2:
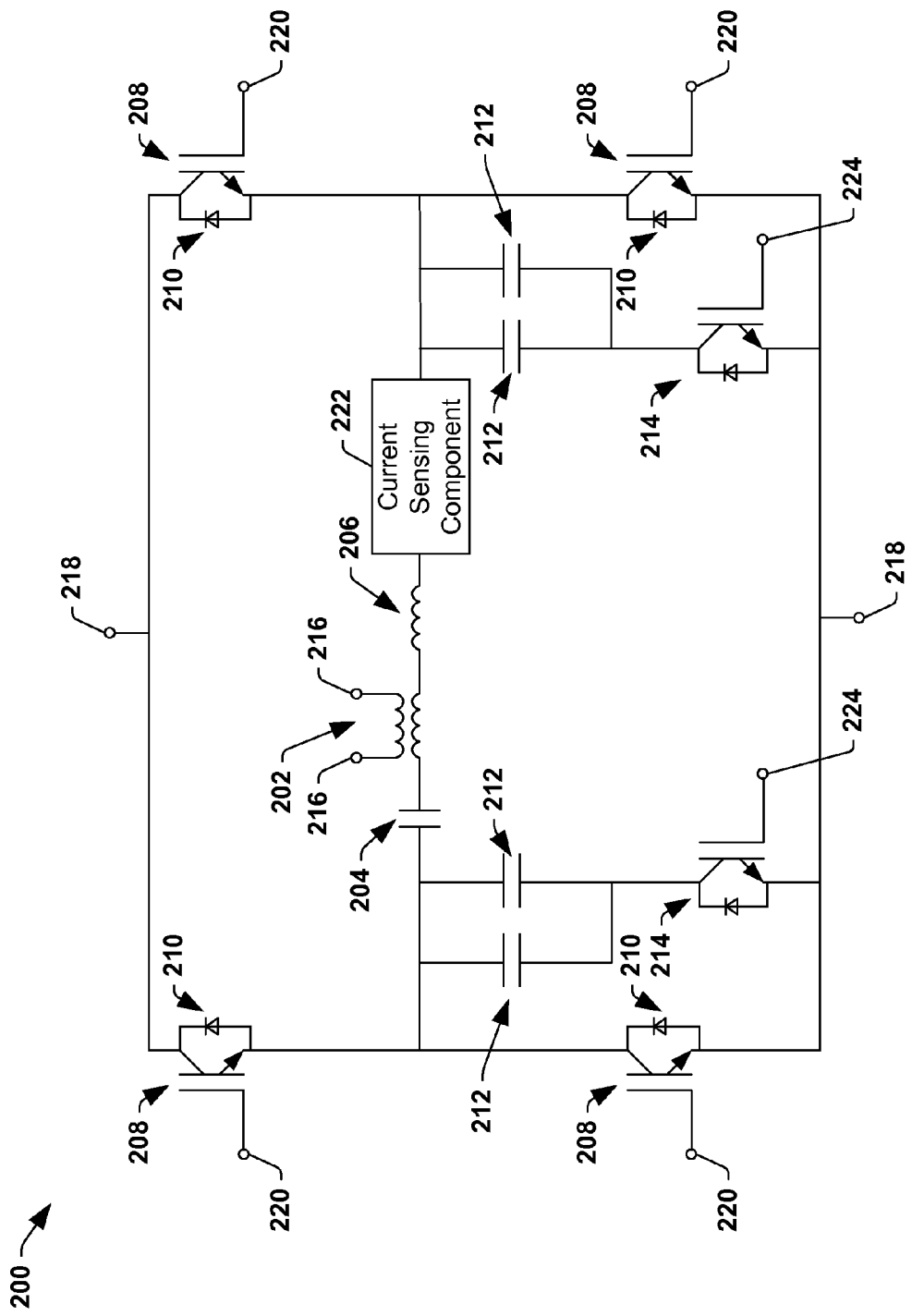
FIG. 2 illustrates an example arrangement of an example inverter comprising selectively, electrically coupled capacitive snubber component.

FIG. 2 illustrates an example arrangement of an inverter 200 of a power source (e.g., 134 in FIG. 1) configured to output power over a large dynamic range. More particularly, FIG. 2 illustrates an example arrangement of a series resonant inverter. However, other types of inverters are also contemplated. For example, in another embodiment, the power source may comprise a parallel resonant inverter.

In general, a resonant inverter is configured to vary a power output by the inverter 200 based upon a frequency of an electrical signal(s) input to the inverter 200 via input nodes 218. As the frequency of the input electrical signal(s) approaches a resonant frequency of the inverter 200, the inverter 200 is configured to produce more power. Conversely, as the frequency of the input electrical signal(s) moves away from the resonant frequency of the inverter 200, the inverter 200 is configured to produce less power. It may be appreciated that a current in the series resonant inverter typically varies directly with the power. Thus, as the frequency of the input signal(s) moves away from the resonant frequency, causing less power to be produced, the current in the resonant inverter is typically reduced. As the frequency of the input signal(s) moves toward the resonant frequency and power output is increased, the current in the resonant inverter is typically increased.

The example inverter 200 comprises, among other things, a transformer 202 configured to modify properties of an output signals (e.g., output to a radiation source and/or other electronic components) relative to properties of a signal input into the transformer 202. More particularly, an electrical signal flows through a primary winding of the transformer 202, inducing an output signal in a secondary winding of the transformer 202. Based upon, among other things, a number of windings in the primary and secondary windings, the current of the signal in the primary winding, and/or the voltage of the primary winding, properties of the signal induced in the secondary winding may differ from the signal flowing through the primary winding. Properties of the induced signal, output from the inverter 200 via output nodes 216, may be a function of, among other things, desired radiation energy (e.g., of a radiation source to which the output signal is supplied) and/or an amount of power required by electronic components that are powered by the inverter 200.

The inverter 200 further comprises a resonant circuit comprised of a resonant capacitor 204 and a resonant inductor 206 that, when connected together (e.g., through the transformer 202), are configured to store electrical energy oscillating at the resonant frequency of the resonant circuit. The resonant frequency is typically determined by the capacitance and inductance values of the capacitor 204 and inductor 206, respectively.

The inverter 200 also comprises a plurality of transistors 208 (e.g., used as electronic switches), respectively coupled in parallel with a diode 210 (e.g., which allows the resonant current to flow in the opposite direction of the switch). In a series resonant inverter, the transistors 208 are typically placed in series with the load (e.g., to form an undamped circuit). Respective transistors 208 are configured to be toggled opened and closed via a signal supplied to respective transistors 208 from an input node 220. In this way, the voltage and/or current of an electrical signal(s) may be altered (e.g., to convert an input signal from a direct current to an alternating current and/or to modify the voltage and/or current of the signal). For example, when a transistor 208 is closed, the voltage applied to the transistor 208 may be zero while the current is high. When the transistor 208 is open, the voltage applied to the transistor 208 may be ramped-up and the current may be ramped-down. It may be appreciated that this ramping up and/or down of the voltage and current may cause switching losses, which may cause power to be dissipated. Such switching losses may reduce the efficiency of the inverter 200 and/or potentially cause the inverter 200 to fail (e.g., if the voltage increase occurs too rapidly). It may be appreciated that the number of transistors 208 and/or the arrangement of such transistors 208 may vary from the illustrated example.

To reduce switching losses, the inverter 200 may comprise one or more snubber components 212, such as capacitive snubber components (e.g., capacitors), configured to slow the transitional period of the signal from a first voltage (e.g., zero volts) to a second voltage. Stated differently, the snubber component 212 is configured to increase the amount of time it takes for the voltage to ramp-up when a transistor 208 is moved from a closed position to an open position. Thus, the snubber component 212 slows the change in voltage across the transistor 208 as it turns off (e.g., while having little to no effect on the change in current). In this way, the energy and power dissipated by the switching is reduced (e.g., switching losses are reduced), causing the power dissipated during the transitional period to be reduced. For example, doubling the transitional period of the voltage may cause the power dissipated during the transitional period to be reduced by one-half (e.g., relative to the power loss if a snubber component 212 was not utilized to slow the transitional period of the voltage).

When the signal input to the inverter 200 at input nodes 218 comprises a frequency that deviates too far from the resonant frequency (e.g., meaning the inverter 200 is to produce less power), the current in the inverter 200 (e.g., the current flowing through the inverter 200) may be insufficient to properly reset the snubber capacitors. As such, the voltage remaining in one or more of snubber(s) components 212 may bleed into one or more transistors 208. Thus, the energy remaining in the snubber component(s) 212 may be dissipated in the inverter 200 (e.g., resulting in a drop in efficiency). At low powers, such dissipation may be greater than the benefits achieved via the snubber(s) components 212.

To mitigate energy/power dissipation at lower current levels that is caused by the bleeding, the example inverter 200 further comprises one or more switching components 214 (e.g., comprising a transformer (e.g., which performs as a switch) in parallel with a diode) respectively configured to couple one or more snubber components 212 to the inverter 200 and/or to electrically decouple the one or more snubbers 212 from the inverter 200 based upon a current of an electrical signal in the inverter 200. More particularly, when the current in the inverter 200 is less than a desired threshold, the one or more switching components 214 are notified (e.g., by a current sensing component 222) via an input node 224. Upon such notification, the one or more switching components 214 may be configured to electrically decouple the one or more snubber components 212 from the inverter 200. When the current in the inverter 200 is greater than the desired threshold, the one or more switching components 216 may be notified and may be configured to electrically couple the one or more snubber components 212 to the inverter 200.

Typically, the desired threshold is a function of a value of current that resets the snubber component(s) 212 (e.g., so that the voltage remaining the snubber components 212 does not bleed into the transistors 208) and/or a DC source voltage. Thus, when the current in the inverter 200 is below a value sufficient to reset the snubber components 212, the switching component(s) 214 may be opened to electrically decouple the snubber component(s) 212 from the inverter 200. When the current reaches a value sufficient to reset the snubber component(s) 212, the switching component(s) 214 may be closed to electrically couple the snubber components(s) 212 to the inverter 200.

It may be appreciated that while reference is made herein to the desired threshold being equivalent to a current value sufficient to reset the snubber component(s) 212, the desired threshold may be set at other current values. For example, at current values slightly below the level sufficient to reset the snubber component(s) 212, the power dissipation caused by the lack of one or more snubber components 212 may be greater than the power dissipation caused by the snubber component(s) 212. As such, the desired threshold may be set to a current value that is below the reset value for the snubber components(s) 212 to optimize (e.g., minimize) power dissipation, for example (e.g., such that the desired threshold is set at a current value that causes the least amount of power dissipation, even if that value is below a value that causes the snubber component(s) 212 to reset). Moreover, in another embodiment, the desired threshold may be a current level that exceeds a level necessary to reset the snubber component(s) 212, for example.

Further, it may be appreciated that different snubber components(s) 212 may behave differently. For example, a first snubber component or set of snubber components may be able to reset at a different current level than a second snubber component or set of snubber components. Thus, the desired threshold may vary from snubber component to snubber component as a function of properties of the snubber component, for example.

In the illustrated embodiment, respective switching components 214 are respectively coupled in series to two snubber components 212 coupled in parallel. However, other arrangements of switching components 214 and/or snubber components 212 are also contemplated. For example, in another embodiment, respective switching components 214 may be electrically coupled to merely one snubber component, such that there may be a one-to-one ratio between snubber components and switching components. Moreover, one or more snubber components of the inverter 200 may not be electrically controlled by a switching component 214 (e.g., meaning that the one or more snubber components may be substantially always electrically coupled to the inverter 200). Further, the snubber/switch arrangements may be positioned at the bottom of the inverter (e.g., as shown), at the top of the inverter 200, and/or at both the bottom and the top of the inverter 200, for example.

The example inverter 200 further comprises a current sensing component 222 configured to determine whether the current of the electrical signal in the inverter 200 (e.g., flowing through the inverter 200) is greater than (e.g., exceeds) the desired threshold. Stated differently, the current sensing component 222 is configured to measure the current in the inverter 200. When the current is greater than the desired threshold, the current sensing component 222 may be configured to send a signal (e.g., such as an electrical signal) to respective switching components 214 notifying the switching components 214 to open (e.g., and electrically decouple respective snubber components 212 from the inverter 200). When the current is less than the desired threshold, the current sensing component 222 may be configured to send a signal (e.g., such as an electrical signal) to respective switching components 214 notifying the switching components 214 to close (e.g., and electrically couple respective snubber components 212 to the inverter 200). It may be appreciated that such a current sensing component 222 may comprise, among other things, a transformer and/or a hall effect sensor, for example, and may be configured to continually provide signals to the switching component(s) 214 (e.g., where a change in the signal is indicative of a change in the current from above the desired threshold to below the desired threshold or vice-versa) and/or may be configured to merely provide a signal when there is a change in the current that causes it to cross the desired threshold. Although specific reference is made herein to a current sensing component 216 comprised of a transformer and/or a hall effect sensor, it may be appreciated that other electronic components/circuits configured to measure a current and/or determine if a current is above or below a desired threshold are also contemplated.

Figure 3:
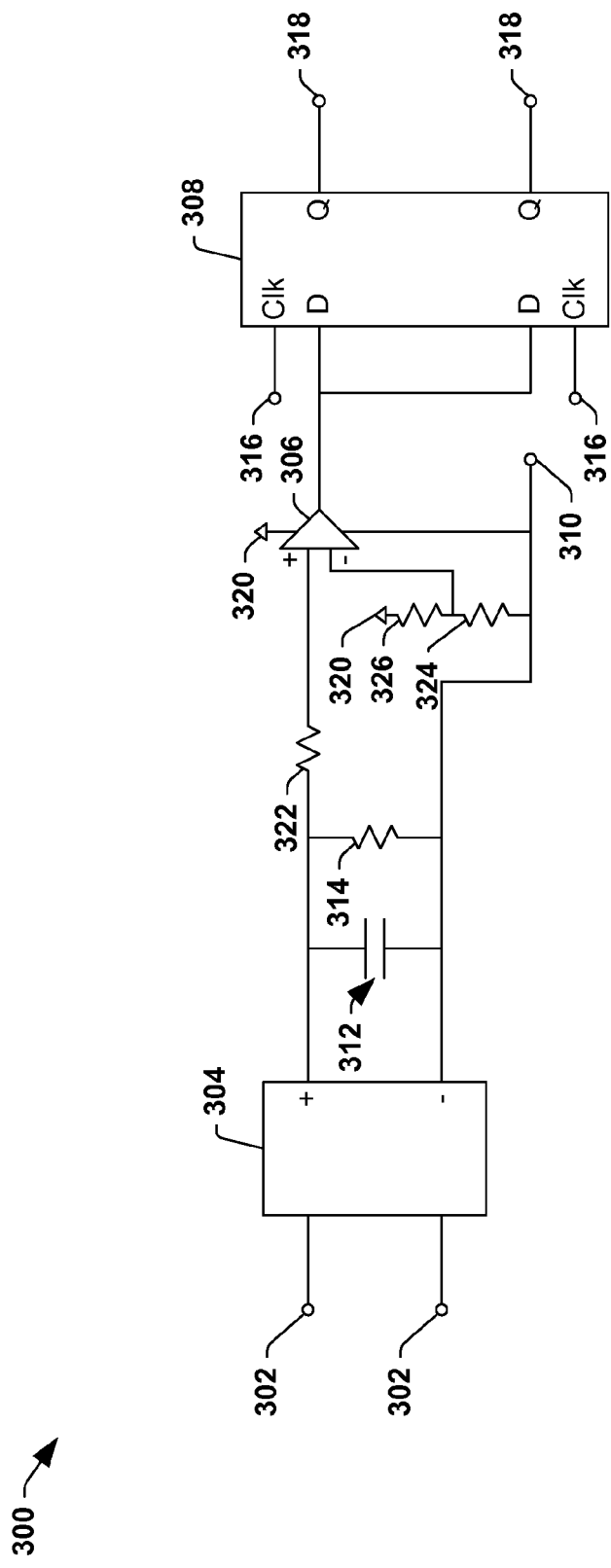
FIG. 3 illustrates an example arrangement of an example current sensing component configured to measure a current flowing through the inverter.

FIG. 3 illustrates an example current sensing component 300 (e.g., 222 in FIG. 2) configured to determine whether a current in an inverter (e.g., 200 in FIG. 2) exceeds a desired threshold and/or to communicate with a switching component (e.g., 214 in FIG. 2) configured to electrically couple/decouple one or more snubber components (e.g., 212 in FIG. 2) from the inverter. It may be appreciated that the illustrated schematic is merely representative of one arrangement for a current sensing component. Other arrangements of electronic components that could be configured to measure the current in a signal and/or determine whether the current exceeds a desired threshold are also contemplated herein. It may also be appreciated that while reference to measuring the current is made herein, it may be appreciated that the current may not be precisely measured, but rather it may be determined whether the current exceeds (e.g., is greater than) a desired threshold.

The electrical signal from the inverter comprising the current to be measured, for example, may be received by the current sensing component 300 at input nodes 302 and transmitted to a rectifier 304 portion of the current sensing component 300. Such a rectifier 304 may be configured to convert an alternative current generated by the inverter to a direct current. By way of example, the rectifier 304 may comprise a full-wave rectifier configured to convert both polarities of the input waveform to a direct current. Although other types of rectifiers, such as half-wave rectifiers, are also contemplated.

The signal output by the rectifier 304 is input to a comparator 306 configured to compare the signal, comprising an unknown current, to an electrical signal have a known current. Stated differently, the comparator 306 is configured to compare a signal comprising a known current level (e.g., the second electrical signal) received at input nodes 320 to a signal comprising an unknown current level (e.g., the electrical signal from the inverter) and to output an indication of which of the two signals comprises a higher current (e.g., such as data indicative of which signal comprises the higher current). The signal comprising the known current level is typically thresholded at the desired threshold. Thus, when the electrical signal from the inverter comprises the higher current, it may be determined that the current in the signal is greater than the desired threshold (e.g., meaning that the current in the inverter is sufficient to support resetting the snubber component), and when the electrical signal comprising the known current is greater, it may be determined that the current in signal is less than the desired threshold (e.g., meaning that the current in the inverter is insufficient to reset the snubber component and may bleed into the transistors unless electrically decoupled from the inverter).

The output of the comparator 306 may be transmitted to one or more flip-flops 308 (e.g., such as D-type flip-flops) configured to capture a value output by the comparator 306 (e.g., labeled "D" input) at a definite portion of a clock cycle. A clock signal indicative of the clock cycle may be received by input nodes 316 (e.g., and labeled "Clk" input). The captured value from the comparator 306 may become the "Q" output, which may be output to the snubber component(s) at output nodes 318 (e.g., which may be connected to input nodes 224 in FIG. 2). Typically, the "Q" output does not change until the value of the comparator 306 changes (e.g., which indicates a change in the current of the inverter from above the desired threshold to below the desired threshold and/or vice-versa).'

It may be appreciated that in one embodiment, there may be more than one flip-flop per switching component (e.g., such that the switching components can be controlled independently). For example, in the illustrated embodiment, the current sensing component 300 comprises two flip-flops (e.g., comprised within a single circuit board). A first of the flip-flops is configured to control the signal output, via a first of the output nodes 318, to a first switching component. A second of the flip-flops is configured to control the signal output, via a second of the output nodes 318, to a second of the switching components.

Other features of the current sensing component 300 may be configured to control the flow of the electrical signal from the inverter and/or the second electrical signal (e.g., comprising the known current value) and/or to condition one or both of the signals, for example. By way of example, resistors 314 and 322 and/or capacitor 312 may be configured to smooth the waveform produced by the rectifier 304 and/or to scale the waveform as desired. Moreover, resistors 324 and 326 may function as a current or voltage divider configured to create a desired reference current for the comparator 306 (e.g., having a current value substantially equally to the desired value), for example. The current sensing component 300 may further comprise a reference node 310, which may be referenced to a DC bus return of the inverter to which the current sensing component 300 is coupled, for example.

Figure 4:
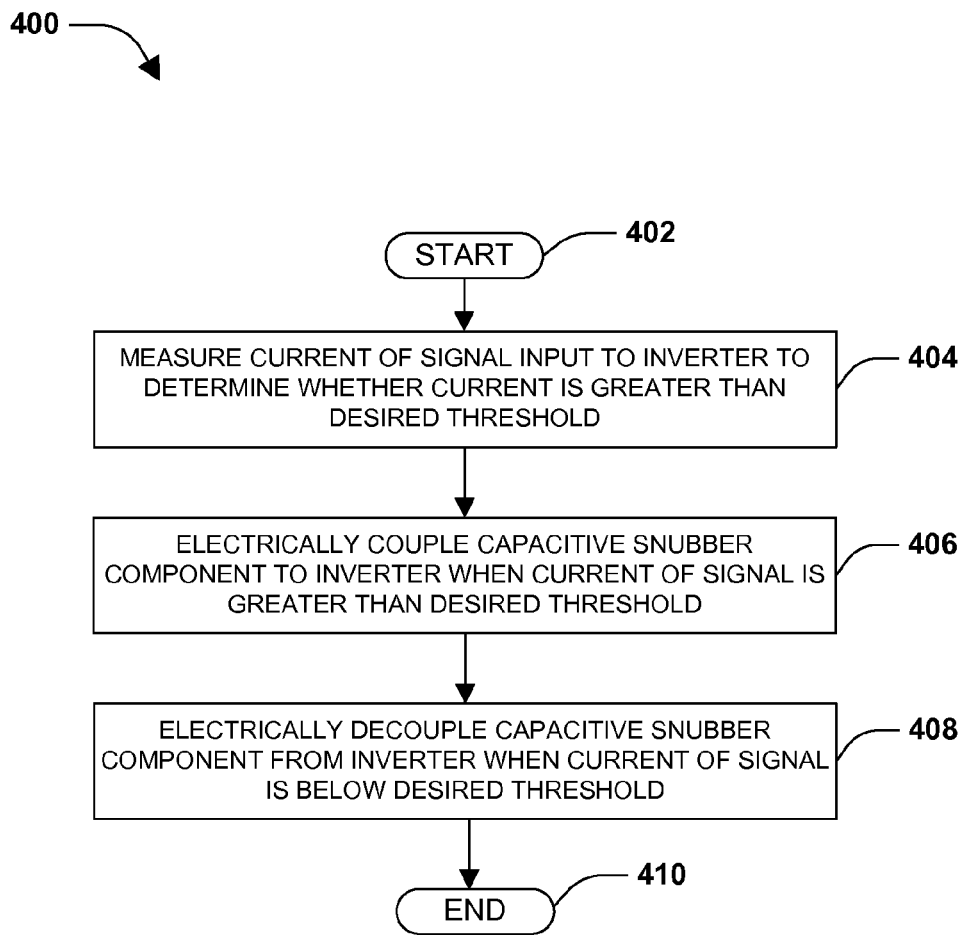
FIG. 4 illustrates an example method for selectively coupling a capacitive snubber component to an inverter.

FIG. 4 illustrates an example method 400 for selectively coupling a capacitive snubber component to an inverter, such a series resonant inverter, a parallel resonant inverter, and/or other types of inverters known to those skilled in the art. In this way, a capacitive snubber component may be utilized when it is desired to output a high level of power (e.g., 60 kW) and may be turned off (e.g., electrically uncoupled) when it is desirable to output less power (e.g., 600 W). It may be appreciated that such an inverter may be configured to output power over a large dynamic range (e.g., the inverter may be designed to output a peak power that is more than 10,000 times greater than its minimum power output). Moreover, such an inverter may be configured to have a peak power output (e.g., which may range from about 10 kW to about 60 kW, although it is often greater than 40 kW and may exceed 60 kW) that is five or more times its average power output (e.g., which may be between about 2 kW and 10 kW).

The example method 400 begins at 402 and the current of an electrical signal(s) flowing though the inverter is measured to determine whether the current is greater than a desired threshold at 404. By way of example, as previously described, the inverter may comprise, among other things, a current sensing component (e.g., 300 in FIG. 3) configured to compare the electrical signal flowing through the inverter to a second electrical signal comprising a known current (e.g., set at the desired threshold). When the current of the electrical signal flowing though the inverter exceeds the current of the second electrical signal, the current of the signal in the inverter may be said to exceed the desired threshold.

As previously described, the desired threshold is typically set as a function of a capacitive snubber component(s) within the inverter. More particularly, the desired threshold is typically set to a value equal to the lowest value of a current that is capable of resetting the capacitive snubber component (e.g., which may be referred to herein as a "reset value"). Thus, currents less that the desired threshold are typically not capable of resetting (e.g., to zero) the capacitive snubber component. Conversely, currents greater than or equal to the desired threshold are typically capable of resetting the capacitive snubber component. Stated differently, currents less than the desired threshold may cause energy stored in the capacitive snubber component to bleed into the transistors, whereas currents greater than or equal to the desired threshold may mitigate such bleeding.

In other embodiments, the desired threshold may differ from the reset value. For example, in some embodiments, the desired threshold may be set lower or higher than the reset value. By way of example, power dissipation from the capacitive snubber component may be less than switching losses at some current levels below the reset value. As such, the desired threshold may be set to reduce (e.g., minimize) power loss, which may, in some embodiments, mean that the desired threshold is less than the reset value if switching losses are greater than power dissipation caused from bleeding of the capacitive snubber component(s) at one or more current levels below the reset value, for example.

The example method 400 also comprises electrically coupling the capacitive snubber component to the inverter when the current of the signal in the inverter is greater than the desired threshold at 406 and electrically decoupling the capacitive snubber component from the inverter when the current of the signal is below the desired threshold at 408. In this way, the capacitive snubber component(s) may be electrically coupled and/or decoupled as a function of the current of the electrical signal in the inverter. By way of example, when the current in the electrical signal in the inverter is increased (e.g., to increase power from a low level to a higher level), the capacitive snubber component may be electrically coupled to the inverter to reduce switching losses cause by the transistors of the inverter, for example. When the current in the electrical signal is decreased (e.g., to decrease power from a higher level to a lower level), the capacitive snubber component may be electrically decoupled from the inverter to reduce energy and/or power dissipation caused when the current supplied to the capacitive snubber component(s) is insufficient to reset the snubber capacitors.

Typically, electrically coupling and decoupling the capacitive snubber component comprises closing and opening, respectively, a switch based upon the measurement made at 404. For example, when the current of an electrical signal in the inverter is greater than the desired threshold, the switch may be closed to electrically couple the capacitive snubber component to the inverter. Conversely, when the current of the electrical signal is less than the desired threshold, the switch may be opened to electrically decouple the capacitive snubber component from the inverter. In this way, the capacitive snubber component may be dynamically coupled/decoupled based upon the measured current, for example (e.g., to reduce (e.g., to a minimum) the amount of energy or power dissipated in the inverter (e.g., caused by switching losses and/or a bleeding capacitive snubber component).

The example method 400 ends at 410.

Figure 5:
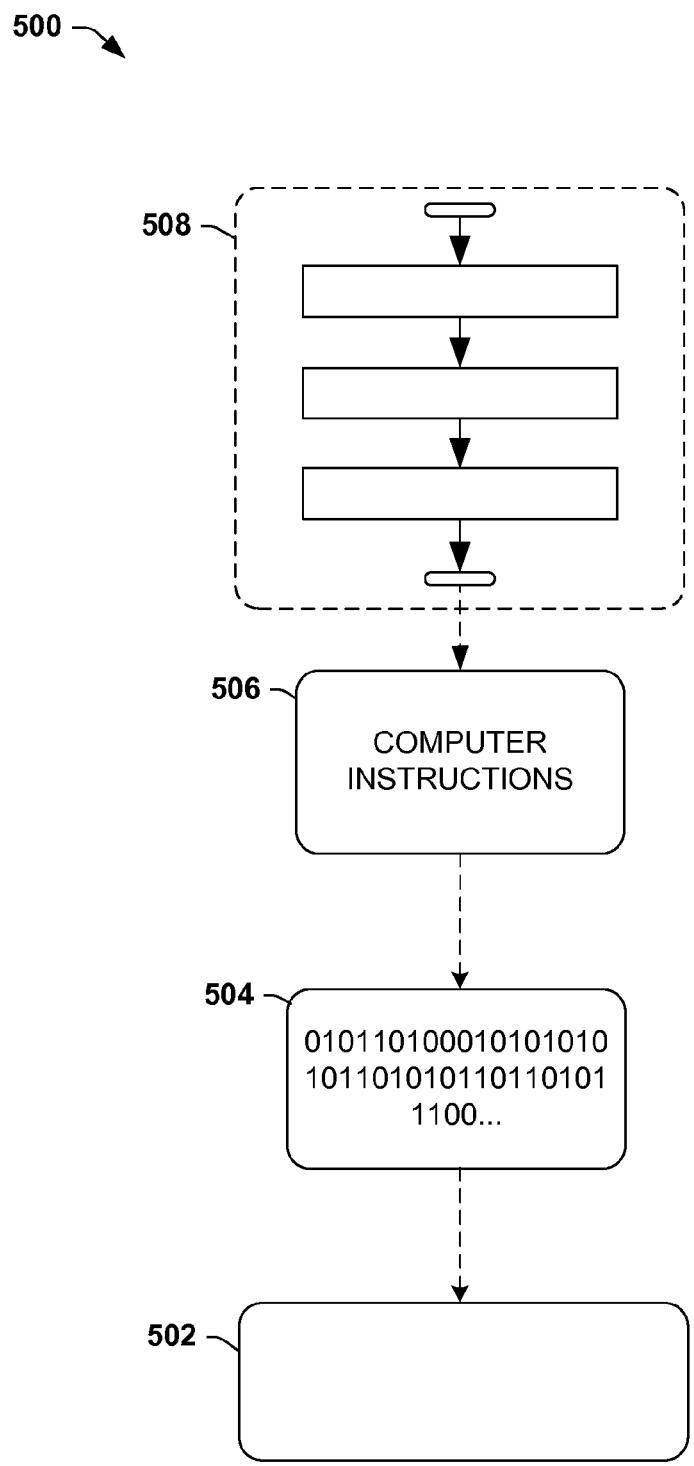
FIG. 5 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 5, wherein the implementation 500 comprises a computer-readable medium 502 (e.g., a CD-R, DVD-R, ASIC, or a platter of a hard disk drive), on which is encoded computer-readable data 504. This computer-readable data 504 in turn comprises a set of computer instructions 506 configured to operate according to one or more of the principles set forth herein. In one such embodiment 500, the processor-executable instructions 506 may be configured to perform a method 508, such as at least some of the example method 400 of FIG. 4, for example. In another such embodiment, the processor-executable instructions 406 may be configured to implement a system, such as at least some of the exemplary scanner 100 of FIG. 1, at least some of the exemplary system 200 of FIG. 2, and/or at least some of the exemplary system 300 of FIG. 3, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An inverter, comprising:
   a resonant circuit comprising:
      a capacitor;
      an inductor; and
      a transformer comprising a winding having a first terminal connected to the capacitor and a second terminal connected to the inductor;
   a snubber arrangement comprising:
      a capacitive snubber component; and
      a switching component coupled in series with the capacitive snubber component and configured to electrically couple the capacitive snubber component to the resonant circuit and to electrically decouple the capacitive snubber component from the resonant circuit based upon a current of an electrical signal through the resonant circuit; and
   a second switching component coupled in parallel with the snubber arrangement.

2. The inverter of claim 1, comprising a current sensing component configured to determine whether the current of the electrical signal is greater than a threshold,
   the switching component configured to electrically couple the capacitive snubber component to the resonant circuit when the current of the electrical signal is greater than the threshold and to electrically decouple the capacitive snubber component from the resonant circuit when the current of the electrical signal is less than the threshold.

3. The inverter of claim 2, the current sensing component comprising a transformer.

4. The inverter of claim 2, the current sensing component comprising a hall effect sensor.

5. The inverter of claim 2, the current sensing component comprising a timing component configured to time at least one of the coupling of the capacitive snubber component to the resonant circuit and the decoupling of the capacitive snubber component from the resonant circuit.

6. The inverter of claim 5, the timing component comprising a flip-flop component.

7. The inverter of claim 1, the switching component comprising a switch configured to be open when the current of the electrical signal is less than a threshold, causing the capacitive snubber component to be electrically decoupled from the resonant circuit, and configured to be closed when the current of the electrical signal is greater than the threshold, causing the capacitive snubber component to be electrically coupled to the resonant circuit.

8. The inverter of claim 7, the threshold a function of a value of the current that resets the capacitive snubber component.

9. The inverter of claim 1, the capacitive snubber component configured to extend a transitional period of the electrical signal from a first voltage to a second voltage.

10. The inverter of claim 1, the inverter comprising a series resonant inverter.

11. The inverter of claim 10, the series resonant inverter configured for a peak output power of between about 10 kW and about 90 kW and an average output power of between about 2 kW and about 10 kW.

12. The inverter of claim 1, the inverter configured to output power, at least some of the output power supplied to a radiation source of a radiology modality that is electrically coupled to the inverter.

13. The inverter of claim 1, comprising a second snubber arrangement comprising:
    a second capacitive snubber component; and
    a third switching component configured to electrically couple the second capacitive snubber component to the resonant circuit and to electrically decouple the second capacitive snubber component from the resonant circuit based upon the current of the electrical signal through the resonant circuit.

14. The inverter of claim 13, comprising a fourth switching component coupled in parallel with the second snubber arrangement.

15. A method for selectively coupling a capacitive snubber component to a resonant circuit of an inverter, comprising:
    measuring a current of an electrical signal through the resonant circuit,
    electrically coupling the capacitive snubber component to the resonant circuit when the current of the electrical signal is greater than a threshold; and
    electrically decoupling the capacitive snubber component from the resonant circuit when the current of the electrical signal is below the threshold.

16. The method of claim 15, the threshold a function of a value of an electrical current that resets the capacitive snubber component.

17. The method of claim 15, the inverter comprising a series resonant inverter.

18. The method of claim 15, the inverter configured to output a peak power that is at least five times an average power output by the inverter.

19. The method of claim 18, the inverter configured to output a peak power of at least 40 kW.

* * * * *